United States Patent
Sim et al.

(10) Patent No.: US 11,525,911 B2
(45) Date of Patent: Dec. 13, 2022

(54) RADAR SYSTEM CONTROL TO PERFORM CROSS-TRAFFIC MANAGEMENT IN A VEHICLE WITH A TRAILER

(71) Applicant: GM Global Technology Operations LLC, Detroit, MI (US)

(72) Inventors: Jay H. Sim, Bloomfield, MI (US); Justin K. Francisco, White Lake, MI (US); Kevin G. Korchmaros, Ypsilanti, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 362 days.

(21) Appl. No.: 16/684,262

(22) Filed: Nov. 14, 2019

(65) Prior Publication Data

US 2021/0149044 A1 May 20, 2021

(51) Int. Cl.
*G01S 13/931* (2020.01)
*B62D 13/06* (2006.01)
*B60T 7/20* (2006.01)

(52) U.S. Cl.
CPC .............. *G01S 13/931* (2013.01); *B60T 7/20* (2013.01); *B62D 13/06* (2013.01); *G01S 2013/9317* (2013.01); *G01S 2013/93185* (2020.01); *G01S 2013/93272* (2020.01)

(58) Field of Classification Search
CPC .... G01S 13/93; G01S 13/931; G01S 13/9315; G01S 13/93185; G01S 13/93272; G01S 13/9317; B62D 13/06; B60T 7/20
USPC .................................................. 342/70, 146
See application file for complete search history.

(56) References Cited

U.S. PATENT DOCUMENTS

| | | | | |
|---|---|---|---|---|
| 4,431,995 A | * | 2/1984 | Barton | G01S 3/42 342/373 |
| 5,023,617 A | * | 6/1991 | Deering | G01S 13/931 342/70 |
| 5,675,343 A | * | 10/1997 | Champeau | H01Q 21/296 342/372 |
| 6,670,910 B2 | * | 12/2003 | Delcheccolo | H01Q 13/10 342/72 |
| 8,432,309 B2 | * | 4/2013 | MacDonald | G01S 13/931 342/123 |
| 9,156,496 B2 | * | 10/2015 | Greenwood | G08G 1/166 |
| 9,566,911 B2 | * | 2/2017 | Greenwood | G06V 20/56 |
| 9,854,209 B2 | * | 12/2017 | Aich | B60W 10/18 |
| 9,971,943 B2 | * | 5/2018 | Greenwood | B60W 50/14 |
| 10,046,800 B2 | * | 8/2018 | Hu | B62D 15/027 |
| 10,276,049 B2 | * | 4/2019 | Prasad | G01S 13/87 |
| 10,351,146 B2 | * | 7/2019 | Prasad | G01S 13/88 |

(Continued)

OTHER PUBLICATIONS

Chinese Office Action for CN Application No. 202011201658.0 dated Jun. 2, 2022, pp. 1-9.

*Primary Examiner* — Erin F Heard
*Assistant Examiner* — Michael W Justice
(74) *Attorney, Agent, or Firm* — Cantor Colburn LLP

(57) ABSTRACT

Systems and methods to control a radar system to perform cross-traffic management in a vehicle with a trailer involve determining a location of the trailer behind the vehicle, and adjusting an initial field of view of the radar system to a modified field of view that excludes the location of the trailer. One or more other vehicles are detected with the radar system having the modified field of view. A cross-traffic alert is implemented based on the detecting the one or more other vehicles.

20 Claims, 3 Drawing Sheets

(56) References Cited

U.S. PATENT DOCUMENTS

| | | | |
|---|---|---|---|
| 10,481,255 B2 | 11/2019 | Prasad et al. | |
| 10,609,340 B2* | 3/2020 | Aich | B62D 15/027 |
| 10,638,025 B2* | 4/2020 | Gali | B62D 13/00 |
| 10,807,639 B2* | 10/2020 | Hu | B62D 15/027 |
| 10,836,376 B2* | 11/2020 | Wodrich | B60W 30/06 |
| 11,086,333 B2* | 8/2021 | Balogh | G01S 13/931 |
| 11,127,301 B1* | 9/2021 | Lai | B60W 30/0956 |
| 2002/0147534 A1* | 10/2002 | Delcheccolo | H01Q 3/40 |
| | | | 342/72 |
| 2003/0055596 A1* | 3/2003 | Studt | G08G 1/16 |
| | | | 702/150 |
| 2008/0231701 A1* | 9/2008 | Greenwood | G01B 11/272 |
| | | | 348/148 |
| 2012/0133547 A1* | 5/2012 | MacDonald | G01S 13/931 |
| | | | 342/70 |
| 2012/0200706 A1* | 8/2012 | Greenwood | H04N 5/2253 |
| | | | 348/148 |
| 2013/0226390 A1* | 8/2013 | Luo | B60D 1/36 |
| | | | 348/148 |
| 2014/0267688 A1* | 9/2014 | Aich | B60W 30/00 |
| | | | 348/113 |
| 2016/0001705 A1* | 1/2016 | Greenwood | B62D 15/021 |
| | | | 348/148 |
| 2016/0041258 A1* | 2/2016 | Cashler | G01S 13/04 |
| | | | 342/70 |
| 2016/0170412 A1* | 6/2016 | Yamamoto | G05D 1/0088 |
| | | | 701/23 |
| 2017/0083773 A1* | 3/2017 | Greenwood | H04N 5/2253 |
| 2017/0363727 A1* | 12/2017 | Prasad | B60W 40/12 |
| 2017/0363728 A1* | 12/2017 | Prasad | G01S 13/88 |
| 2018/0043933 A1* | 2/2018 | Hu | G06V 10/443 |
| 2018/0061239 A1* | 3/2018 | Prasad | G06V 20/56 |
| 2018/0109762 A1* | 4/2018 | Aich | B62D 13/06 |
| 2018/0220034 A1* | 8/2018 | Katayama | H04N 1/00798 |
| 2018/0319437 A1* | 11/2018 | Hu | G06V 10/443 |
| 2019/0170867 A1* | 6/2019 | Wang | G01S 17/08 |
| 2019/0220034 A1* | 7/2019 | Balogh | G05D 1/0257 |
| 2019/0297233 A1* | 9/2019 | Gali | G06T 7/60 |
| 2020/0259976 A1* | 8/2020 | Gali | G06T 7/60 |
| 2020/0341118 A1* | 10/2020 | Chen | G05D 1/0246 |
| 2021/0055373 A1* | 2/2021 | Smith | G01S 13/865 |
| 2021/0055375 A1* | 2/2021 | Smith | G01S 7/295 |
| 2021/0061261 A1* | 3/2021 | Wodrich | B60W 30/18163 |
| 2021/0287548 A1* | 9/2021 | Lai | B60R 1/025 |
| 2021/0325897 A1* | 10/2021 | Balogh | B60R 1/00 |

* cited by examiner

RADAR SYSTEM CONTROL TO PERFORM CROSS-TRAFFIC MANAGEMENT IN A VEHICLE WITH A TRAILER

INTRODUCTION

The subject disclosure relates to radar system control to perform cross-traffic management in a vehicle with a trailer.

Vehicles (e.g., automobiles, trucks, motor cycles, construction equipment, farm equipment, automated factory equipment) include an ever-increasing array of sensors. These sensors obtain information about the vehicle and its environment and facilitate autonomous implementation of some or all operations of the vehicles or alerts to the driver. Exemplary sensors include a radar system, a lidar system, and a camera. Exemplary semi-autonomous systems in vehicles may perform collision avoidance, adaptive cruise control, or automatic braking. Another exemplary system in a vehicle is a cross-traffic alert and/or automated braking system. When the vehicle is reversing, the cross-traffic alert and/or automated braking system warns the driver of other vehicles entering the reverse path (i.e., cross-traffic) and may additionally automatically apply the brake to avoid a collision with another vehicle. This type of system generally relies on a radar system to detect the cross-traffic. When the vehicle has a trailer behind it, the radar system function may be negatively affected. This is because the trailer, which is relatively close to the radar system and has a high radar signature, would produce high amplitude reflections that increase the detection floor and, thus, obscure other, farther objects. Accordingly, it is desirable to provide radar system control to perform cross-traffic management in a vehicle with a trailer.

SUMMARY

In one exemplary embodiment, a method for controlling a radar system to perform cross-traffic management in a vehicle with a trailer includes determining a location of the trailer behind the vehicle, and adjusting an initial field of view of the radar system to a modified field of view that excludes the location of the trailer. The method also includes detecting one or more other vehicles with the radar system having the modified field of view, and implementing a cross-traffic alert based on the detecting the one or more other vehicles.

In addition to one or more of the features described herein, the method also includes obtaining dimensions of the trailer.

In addition to one or more of the features described herein, the method also includes obtaining an articulation angle, the articulation angle being an angle between a center axial line of the vehicle and a center axial line of the trailer.

In addition to one or more of the features described herein, the obtaining the articulation angle includes performing image processing on an image obtained by a camera with a field of view that includes the trailer.

In addition to one or more of the features described herein, the determining the location of the trailer behind the vehicle is based on the dimensions of the trailer and on the articulation angle.

In addition to one or more of the features described herein, the method also includes determining an overlap region between the initial field of view and the location of the trailer.

In addition to one or more of the features described herein, the adjusting the initial field of view includes excluding the overlap region in the modified field of view based on turning off a subset of antenna elements or on performing beamforming.

In addition to one or more of the features described herein, the method also includes filtering reflections received as a result of transmission by the radar system in the modified field of view to eliminate any of the reflections that result from the trailer.

In addition to one or more of the features described herein, the method also includes determining, using the controller, whether the vehicle is in reverse gear, wherein implementing the method is based on determining that the vehicle is in the reverse gear.

In addition to one or more of the features described herein, the method also includes computing a time to collision based on the detecting the one or more other vehicles in a path of the vehicle and providing an alert or implementing automatic braking based on the time to collision being less than a threshold value.

In another exemplary embodiment, a system to perform cross-traffic management in a vehicle with a trailer includes a radar system with a modified field of view. The radar system detects one or more other vehicles. The system also includes a controller to determine a location of the trailer behind the vehicle, to adjust an initial field of view of the radar system to the modified field of view that excludes the location of the trailer, and to implement a cross-traffic alert based on the radar system detecting the one or more other vehicles.

In addition to one or more of the features described herein, the controller obtains dimensions of the trailer.

In addition to one or more of the features described herein, the controller obtains an articulation angle. The articulation angle is an angle between a center axial line of the vehicle and a center axial line of the trailer.

In addition to one or more of the features described herein, the system also includes a camera. The controller obtains the articulation angle by performing image processing on an image obtained by the camera with a field of view that includes the trailer.

In addition to one or more of the features described herein, the controller determines the location of the trailer behind the vehicle based on the dimensions of the trailer and on the articulation angle.

In addition to one or more of the features described herein, the controller determines an overlap region between the initial field of view and the location of the trailer.

In addition to one or more of the features described herein, the controller excludes the overlap region to adjust the initial field of view to the modified field of view. The radar system implements the modified field of view based on turning off a subset of antenna elements or on performing beamforming.

In addition to one or more of the features described herein, the controller filters reflections received as a result of transmission by the radar system in the modified field of view to eliminate any of the reflections that result from the trailer.

In addition to one or more of the features described herein, the controller determines whether the vehicle is in reverse gear and implements the cross-traffic alert based on determining that the vehicle is in the reverse gear.

In addition to one or more of the features described herein, the controller computes a time to collision based on the one or more other vehicles being in a path of the vehicle and implements an alert or automatic braking based on the time to collision being less than a threshold value.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
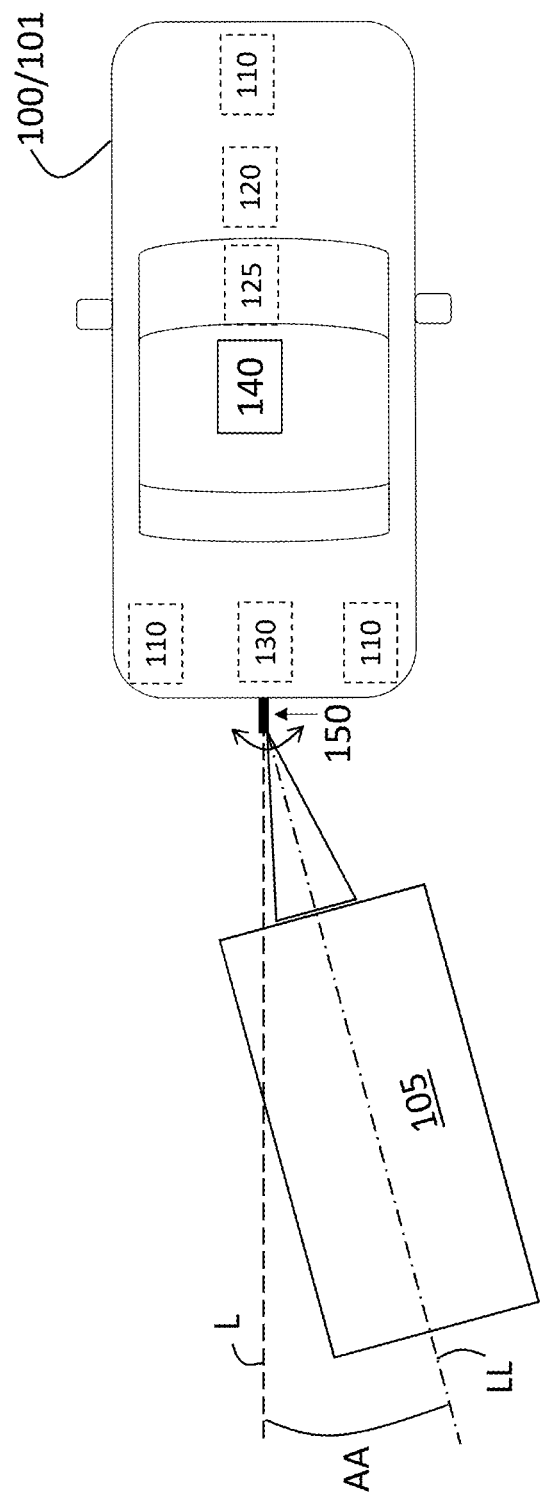
FIG. 1 is a block diagram of a vehicle with a trailer that includes radar system control to perform cross-traffic management according to one or more embodiments.

The following description is merely exemplary in nature and is not intended to limit the present disclosure, its application or uses. It should be understood that throughout the drawings, corresponding reference numerals indicate like or corresponding parts and features.

As previously noted, many vehicle operations may be aided or performed autonomously based on sensor information. A cross-traffic alert and/or automated braking system uses radar information about cross-traffic behind the vehicle during a reversing maneuver. As previously noted, a trailer attached to the back of the vehicle can negatively affect the radar system results. This is because the trailer obscures the field of view (FOV) of the radar system. Thus, prior cross-traffic alert and/or automated braking systems are disabled when a trailer is attached to the vehicle.

Embodiments of the systems and methods detailed herein relate to radar system control to perform cross-traffic management in a vehicle with a trailer. The radar system control according to one or more embodiments is facilitated by information about the dimensions of the trailer and about the articulation angle of the trailer relative to the vehicle. This information is obtained using one or more cameras. Existing vehicles may use this information to augment a rear-view image displayed to the driver in order to make the trailer invisible in the image. According to one or more embodiments, the dimension and articulation angle information is used to adjust the FOV of one or more rear radar systems and to filter any unwanted reflections from the trailer.

In accordance with an exemplary embodiment, FIG. 1 is a block diagram of a vehicle 100 with a trailer 105 that includes radar system control to perform cross-traffic management. The exemplary vehicle 100 in FIG. 1 is an automobile 101. The exemplary sensors shown and discussed are not intended to limit the numbers or types of sensors that may be in or on the vehicle 100 according to alternate embodiments. Three radar systems 110 are shown with one being forward-looking and two being rear-facing. A rear-facing camera 130 and a lidar system 140 are also shown. The trailer 105 is attached to the vehicle 100 at a hitch 150 that acts as a pivot joint and allows the trailer 105 to move relative to the vehicle 100, as indicated by the double-sided arrow. The angle between the center axial line L of the vehicle 100 and the center axial line LL of the trailer 105 is the articulation angle AA. Processing of images obtained with the camera 130 may facilitate determination of the articulation angle AA. Alternately, a sensor at the hitch 150 may measure the articulation angle AA.

The vehicle 100 also includes a controller 120, which may instead be a collection of two or more controllers 120 that communicate with each other to perform the functionality discussed herein. The controller 120 may interact with an infotainment system 125 that provides alerts and other output to an operator (e.g., driver) of the vehicle 100 and may also obtain inputs from the operator. The inputs include dimensions of the trailer 105. The processing of reflections received by the radar systems 110 and the control of the radar systems 110 may be performed by the radar systems 110 themselves, by the controller 120, or by a combination of the two. Information (e.g., articulation angle AA) from one or more cameras 130 and information from an operator (e.g., dimensions of trailer 105) may be obtained by the controller 120 to facilitate the control of the radar systems 110, as further discussed with reference to FIG. 3.

The controller 120 includes processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. For example, one or more memory devices of the controller 120 may store received information, such as the dimensions of the trailer 105, and one or more processors of the controller 120 may execute stored instructions to perform the functionality detailed herein.

Figure 2:
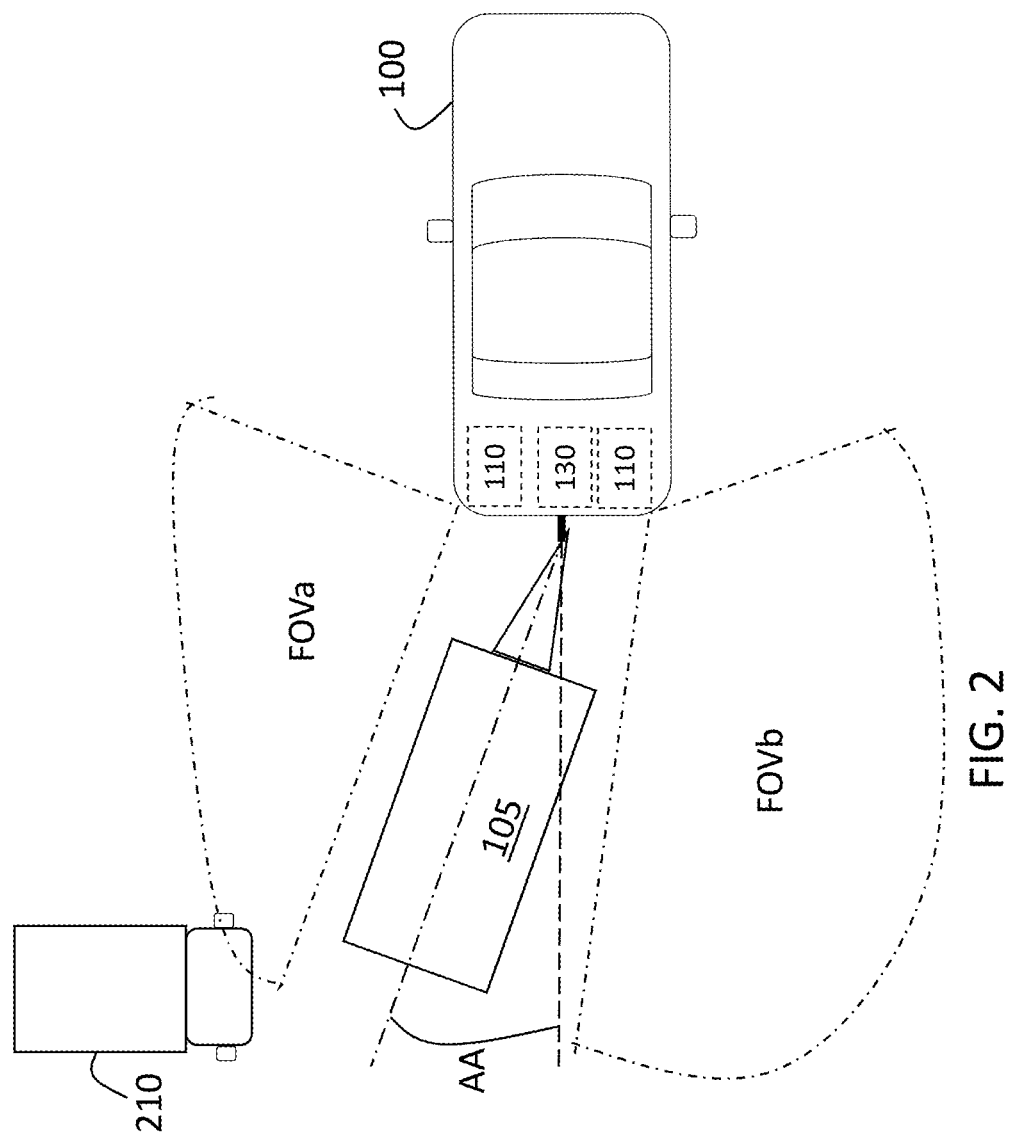
FIG. 2 shows a scenario that illustrates radar system control to perform cross-traffic management in a vehicle with a trailer according to one or more embodiments.

FIG. 2 shows a scenario that illustrates radar system control to perform cross-traffic management in a vehicle 100 with a trailer 105 according to one or more embodiments. An exemplary truck 210 represents the cross-traffic that the vehicle 100 and trailer 105 may collide with without the cross-traffic alert or braking facilitated by the radar system control according to one or more embodiments. Two exemplary fields of view FOVa and FOVb corresponding to the radar systems 110 are indicated in FIG. 2. As shown, field of view FOVa is smaller than field of view FOVb. This is because, based on the articulation angle AA, the trailer 105 would be in the field of view FOVa if the fields of view FOVa and FOVb were the same size. This modification of the field of view FOVa is part of the radar system control according to one or more embodiments. Another aspect of radar system control pertains to the processing of reflections obtained at the radar systems and is further discussed with reference to FIG. 3.

Figure 3:
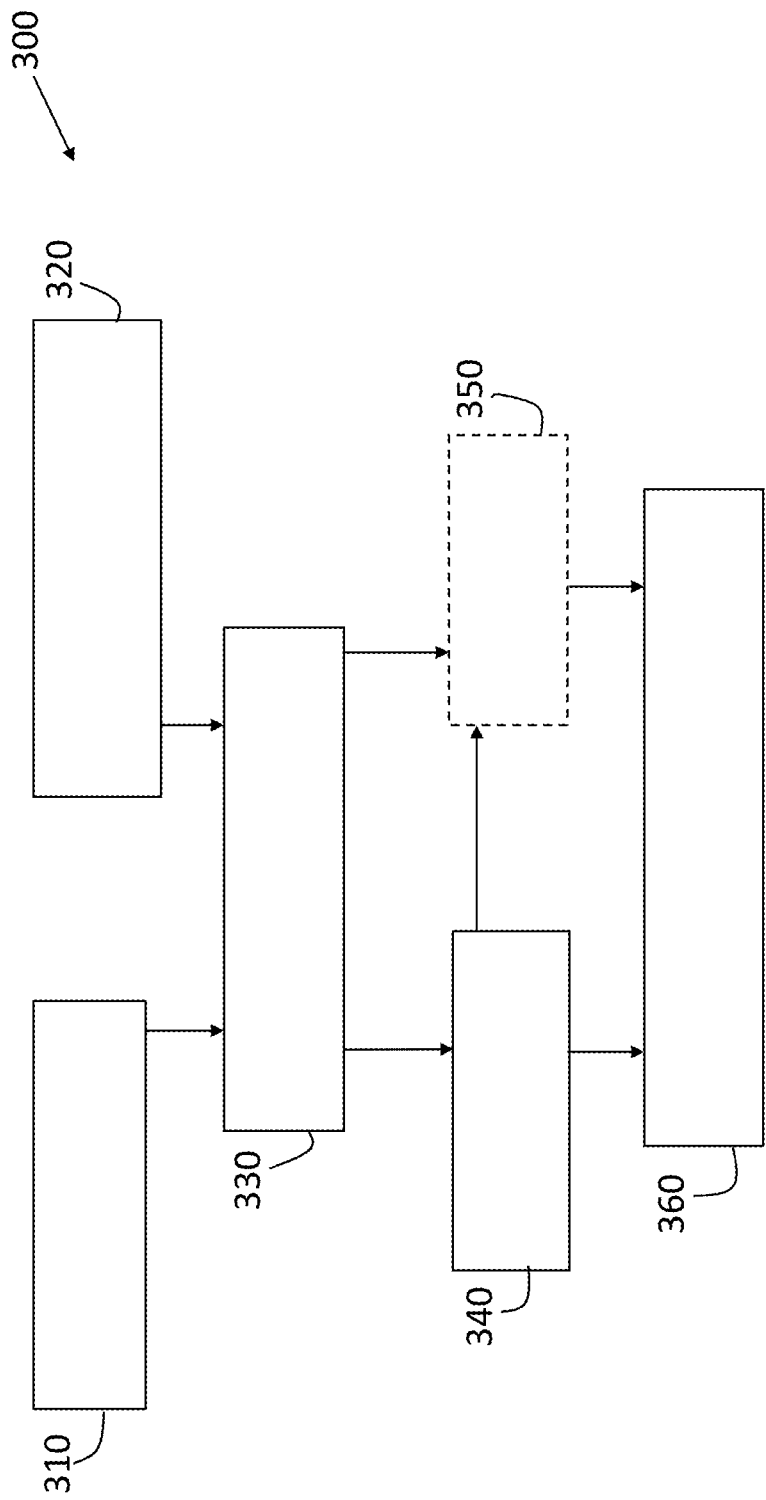
FIG. 3 is a process flow of a method of performing radar system control to perform cross-traffic management in a vehicle with a trailer according to one or more embodiments.

FIG. 3 is a process flow of a method 300 of implementing radar system control to perform cross-traffic management in a vehicle 100 with a trailer 105 according to one or more embodiments. The method 300 may be performed when the controller 120 determines that the reverse gear of the vehicle 100 is engaged, for example. At block 310, obtaining dimensions of the trailer 105 includes an operator of the vehicle 100 inputting dimensions via the infotainment system 125. The infotainment system 125 may be in communication with the controller 120 and may provide the dimensions to the controller 120. At block 320, obtaining articulation angle AA includes the controller 120 obtaining images from one or more cameras 130 with a view of the trailer 105. Processing of the images by the controller 120 to determine the articulation angle AA may be part of the functionality enabled to display the trailer 105 as invisible (e.g., in a see-through fashion) behind the vehicle 100 via the infotainment system 125. This display feature requires determining the location of the trailer 105 relative to the vehicle 100, at block 330.

The radar control operations are discussed with reference to blocks 340 and 350. As indicated, the processing at block 350 may be optional. At block 340, adjusting the field of view of one or more radar systems 110 includes determining an overlap between the default field of view of each radar system 110 and the location of the trailer 105. The field of view is then modified to ensure that the trailer 105 is not within the field of view. Modifying the field of view may be achieved in a number of ways based on the specific type of radar system 110 being used. According to an exemplary embodiment, modifying the field of view includes turning off (i.e., not transmitting from) antenna elements whose main beam includes the trailer 105. According to another exemplary embodiment, modifying the field of view includes limiting a beamforming angle to exclude an area with the trailer 105. The particular implementation used to modify the field of view is not intended to be limited by the examples. Any known mechanism to modify the field of view to exclude an area with the trailer 105 is within the contemplated scope.

At block 350, filtering reflections resulting from transmissions by one or more radar systems 110 is optional, as indicated. As previously noted, one or more cameras 130 may be used to obtain rear-facing images. Processing these images (e.g., by the controller 120) facilitates determining the articulation angle AA and, in conjunction with the dimensions of the trailer 105 (obtained at block 310), the location of the trailer 105 (at block 330). The processes 320, 330 may be performed periodically while the reverse gear is engaged. Adjustment of the field of view, at block 340, may also be performed periodically. However, there may be a delay (e.g., a few seconds) between determination of the location of the trailer 105 (at block 330) and adjustment of the field of view of one or more radar systems 110 according to the location of the trailer 105 (at block 340). Thus, a part of the trailer 105 may move into the modified field of view of one or more of the radar systems 110. By the time the location of the trailer 105 is updated (at block 330), one or more radar systems 110 may have emitted transmissions within the previously modified field of view (at block 340).

That is, there may be a chance of at least a portion of the trailer 105 being in the field of one or more radar systems 110 despite the modification of the field of view as part of the processing at block 340. This will result in a high-amplitude reflected energy from the portion of the trailer 105 that is encountered by the emitted transmission. Filtering the reflections to address this scenario, at block 350, may be implemented in a number of ways. According to an exemplary embodiment, the high amplitude of the reflected energy may be used to associate the reflection with the trailer 105. According to another exemplary embodiment, the range of the reflected energy additionally or alternately with the known (possibly inaccurate) location of the trailer 105 (from block 330) may be used to associate the reflected energy with the trailer 105. Once identified, the reflected energy associated with the trailer 105 may then be filtered (e.g., zeroed out) to avoid artificially increasing the detection threshold according to a constant false alarm rate (CFAR) scheme, for example. As previously noted, the processing of the reflections resulting from transmissions by one or more radar systems 110 may be performed by the radar systems 110, the controller 120, or both.

At block 360, implementing cross-traffic alert and/or braking is not modified from existing systems and, therefore, is only generally described herein. Once the process at block 340 and, optionally, at block 350 has been performed, the cross-traffic management may be handled in the same way as when the trailer 105 is not present. However, the position of the trailer 105 must be considered for purposes of determining the potential for a collision. Specifically, reflections received at one or more radar systems 110 may be processed by the radar systems 110, controller 120, or both to identify any cross-traffic (e.g., the truck 210 shown in FIG. 2) in the reversing path of the vehicle 100. The detection of cross-traffic results in the calculation of time to collision (TTC). This calculation is performed continuously and, if the TTC is less than a threshold value, for example, may result in an alert to the vehicle operator via the infotainment system 125, for example. Additionally, the controller 120 may activate automatic braking of the vehicle 100 based on the TTC.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method for controlling a radar system to perform cross-traffic management in a vehicle with a trailer, the method comprising:
   determining, using a controller, a location of the trailer behind the vehicle;
   adjusting a field of view of the radar system such that the field of view excludes the location of the trailer;
   detecting one or more other vehicles with the radar system having the modified field of view; and
   implementing a cross-traffic alert or automatic braking based on the detecting the one or more other vehicles.

2. The method according to claim 1, further comprising obtaining dimensions of the trailer.

3. The method according to claim 2, further comprising obtaining an articulation angle, the articulation angle being an angle between a center axial line of the vehicle and a center axial line of the trailer.

4. The method according to claim 3, wherein the obtaining the articulation angle includes performing image processing on an image obtained by a camera with a field of view that includes the trailer.

5. The method according to claim 3, wherein the determining the location of the trailer behind the vehicle is based on the dimensions of the trailer and on the articulation angle.

6. The method according to claim 1, further comprising determining an overlap region between the field of view prior to the adjusting and the location of the trailer.

7. The method according to claim 6, wherein the adjusting the field of view includes excluding the overlap region in the field of view based on turning off a subset of antenna elements or on performing beamforming.

8. The method according to claim 1, further comprising filtering reflections received as a result of transmission by the radar system in the field of view to eliminate any of the reflections that result from the trailer.

9. The method according to claim 1, further comprising determining, using the controller, whether the vehicle is in reverse gear, wherein implementing the method is based on determining that the vehicle is in the reverse gear.

10. The method according to claim 1, further comprising computing a time to collision based on the detecting the one or more other vehicles in a path of the vehicle and providing the cross-traffic alert or implementing the automatic braking based on the time to collision being less than a threshold value.

11. A system to perform cross-traffic management in a vehicle with a trailer, the system comprising:
a radar system with a modified field of view, the radar system configured to detect one or more other vehicles; and
a controller configured to determine a location of the trailer behind the vehicle, to adjust a field of view of the radar system such that the field of view excludes the location of the trailer, and to implement a cross-traffic alert or automatic braking based on the radar system detecting the one or more other vehicles.

12. The system according to claim 11, wherein the controller is configured to obtain dimensions of the trailer.

13. The system according to claim 12, wherein the controller is configured to obtain an articulation angle, the articulation angle being an angle between a center axial line of the vehicle and a center axial line of the trailer.

14. The system according to claim 13, further comprising a camera, wherein the controller is configured to obtain the articulation angle by performing image processing on an image obtained by the camera with a field of view that includes the trailer.

15. The system according to claim 13, wherein the controller is configured to determine the location of the trailer behind the vehicle based on the dimensions of the trailer and on the articulation angle.

16. The system according to claim 11, wherein the controller is configured to determine an overlap region between the field of view prior to adjustment and the location of the trailer.

17. The system according to claim 16, wherein the controller is configured to exclude the overlap region to adjust the field of view, and the radar system is configured to implement the adjustment of the field of view based on turning off a subset of antenna elements or on performing beamforming.

18. The system according to claim 11, wherein the controller is further configured to filter reflections received as a result of transmission by the radar system in the field of view to eliminate any of the reflections that result from the trailer.

19. The system according to claim 11, wherein the controller is further configured to determine whether the vehicle is in reverse gear and to implement the cross-traffic alert based on determining that the vehicle is in the reverse gear.

20. The system according to claim 11, wherein the controller is further configured to compute a time to collision based on the one or more other vehicles being in a path of the vehicle and to implement the cross-traffic alert or the automatic braking based on the time to collision being less than a threshold value.

* * * * *